(12) United States Patent
Douglas et al.

(10) Patent No.: US 7,075,906 B2
(45) Date of Patent: Jul. 11, 2006

(54) METHOD AND APPARATUS FOR CELL IDENTIFICATION IN WIRELESS DATA NETWORKS

(75) Inventors: Bretton Lee Douglas, San Jose, CA (US); Eldad Perahia, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 199 days.

(21) Appl. No.: 10/676,878

(22) Filed: Sep. 30, 2003

(65) Prior Publication Data

US 2005/0088998 A1    Apr. 28, 2005

(51) Int. Cl.
*H04Q 7/00*    (2006.01)

(52) U.S. Cl. ............................. 370/328; 370/469
(58) Field of Classification Search ............ 370/252, 370/310, 313, 315, 328, 329, 351, 338, 389, 370/442, 430, 319, 334, 344, 203–210, 469, 370/473, 474, 445
See application file for complete search history.

(56) References Cited

U.S. PATENT DOCUMENTS 6,804,191 B1 * 10/2004 Richardson ............... 370/208
2003/0153346 A1   8/2003 Kim et al. ................. 455/522

OTHER PUBLICATIONS

Stallings, Data and Computer Communications, 1997, Prentice-Hall, Inc., fifth edition, PP: 512-513, 517.*
Conley, C. "Securing WLANS with Location-Enabled Networks." *Wireless Security Perspectives*, vol. 5, No. 3, Mar., 2003. Organization website: www.cnp-wireless.com/wsp.html.

* cited by examiner

*Primary Examiner*—David Vincent
(74) *Attorney, Agent, or Firm*—Dov Rosenfeld; Inventek

(57) ABSTRACT

A method including wirelessly receiving a packet at a wireless station belonging to a cell of a wireless network, the network for communicating according to a wireless network standard, each transmitting station of the cell able to transmit a packet that includes cell identification information; and ascertaining at the physical layer level whether or not the received packet is from another station of the cell by ascertaining whether or not the received packet includes the cell identification information of the cell.

58 Claims, 8 Drawing Sheets

Rsv = Reserved
Par = Parity
L11 = Length[11]
S0 = Service[7]

METHOD AND APPARATUS FOR CELL IDENTIFICATION IN WIRELESS DATA NETWORKS

BACKGROUND

Wireless networks that have an infrastructure that includes a central station through which all other wireless stations communicate are now in common use for wireless data networks such as wireless local area networks (PLANS). Such infrastructure networks resemble cellular wireless networks that have a set of cells, the client stations within each communicating via a central station sometimes called a base station. The IEEE 802.11 standard in all its variations, for example, is now in common use for WLANs, and defines an infrastructure network having an access point (AP) through which all other stations (called client stations herein) of the same infrastructure network, also called a basic service set (BSS), communicate. It may be that several such BSSs exist in an area. A common approach to increasing capacity in a cellular network such as a cellular telephone network is to reuse the frequency bands as often as possible among cells in the network. However, this approach is not effective at increasing capacity in a wireless network such as one conforming to the IEEE 802.11 standard. For example, in a network conforming to one of the IEEE 802.11 OFDM variants, e.g., to the IEEE 802.11a or 802.11g standard, there can be a difference in receiver sensitivity of more than 15 dB between the highest data rate and lowest data rate. Therefore, if the region of coverage of a BSS (a "cell") is sized such that typical performance at the boundary of the region of coverage of the BSS (the "cell boundary") is at the highest data rate, then a signal transmitted at the lowest data rate can be received much farther away, and therefore might be a source of co-channel interference in a nearby cell.

According to the physical layer (PHY) parts of the IEEE 802.11 standard, a receiving station at the physical layer cannot differentiate between signals received from transmitters in its own cell versus transmitters in a neighboring co-channel cell. It is at the MAC layer that such a determination can occur. Thus, when a co-channel transmission is received, the receiver processes the signal until the end of the packet before the receiver MAC can determined whether or not the packet is intended for itself. So if the receiver is receiving an unintended co-channel signal, the medium is not available the entire time the receiver is processing the unintended co-channel signal. Much of the increase in spectral efficiency from frequency reuse may be lost due to such co-channel interference.

Thus there is a need in the art for a method and apparatus that can rapidly ascertain, e.g., at the physical layer whether or not a received packet is intended for the receiving station.

SUMMARY

One aspect of the invention provides for ascertaining, at the physical layer level, whether or not a packet received at a station of a cell of a wireless network is from another station of the cell. A cell in the context of the invention is a set of wireless stations of a wireless network that are meant to communicate with each other. An example of a cell is an infrastructure network in which there is one station, called the access point, through which each station of the cell communicates. Another example of a cell is an ad-hoc network of stations that communicate with each other.

According to a first OFDM embodiment according to which each packet has a preamble that includes a plurality of short symbols, the last few short symbols are encoded such that each co-channel cell is given a different sequence. Then, the physical layer of the receiver can determine whether the packet is from an intra-cell or inter-cell transmitter. If the packet is from an inter-cell transmitter, the receiver can terminate processing at the very beginning of the packet. This minimizes or at least reduces the amount of time that the medium would be otherwise occupied.

According to another embodiment wherein each packet includes a special field that provides information on how the packet is encoded, the special field according to the standard including some reserved or unused bits, the cell identification information uses some or all of the reserved or unused bits in such a field to differentiate between co-channel cells.

According to another embodiment, each packet includes a special field that provides information on how the packet is encoded, the special field includes one or more additional fields, including a field to convey the cell identification information to provide for differentiating between co-channel cells.

According to yet another embodiment, one or more symbols of the encoded packet data are reserved for network information, and bits that according to the standard being used are empty or are reserved are used to convey cell identification information such that a receiving station can differentiate between co-channel cells.

Each of the embodiments has advantages and disadvantages. The second embodiment that uses the empty bits in the special field is simple to implement. However, not many of the bits in the special bits may be unused or reserved. Furthermore, more time is required before a determination is made regarding the cell of the packet than using the first embodiment. With the third embodiment, more bits may be available, but the third embodiment involves even more delay for cell identification.

In all three embodiments, a unique identifier is provided for each co-channel cell in the network, e.g., for each co-channel access point. In one embodiment, this identifier is communicated to intra-cell clients via the MAC protocol during initial hand-shaking between an access point and a client station.

According to some variations, the unique identifier may be conveyed in a coded form to provide for error detection and/or correction.

Another aspect of the invention is a receiver that includes a signal processor with demodulation/re-modulation functionality and further processing to subtract out a signal determined to be an interfering signal. Consider such a receiver receiving a weak co-channel interfering signal prior to, but overlapping with, a desired signal, i.e., a signal designated for that receiver. Using the methods described above, the interfering signal may be ascertained to be from another cell, i.e., a co-channel interferer. The new signal processor in the receiver with demodulation/re-modulation functionality can subtract out the interfering signal. Subsequently, the signal can be processed for the desired signal without loss of the intended packet. Such an enhancement may further improve system capacity.

According to yet another aspect, a receiver incorporates an antenna array and smart antenna processing that provides for mitigating interference based on packets that are ascertained to be from interferers. Thus, once a signal is ascertained to be an interferer, its spatial signature may be determined, and a smart antenna processing strategy used that mitigates interference from transmitters having such a

BRIEF DESCRIPTION OF THE DRAWINGS

FIG. 3A and 3B FIGS. 2A and 2B show two examples of Quartenary Phase Shift Keying (QPSK) encoding used on the last four short symbols to convey Cell-ID information according to an embodiment of the invention.

DETAILED DESCRIPTION

One aspect of the invention provides for ascertaining, at the physical layer level, whether or not a packet received at a station of a cell of a wireless network is from another station of the cell. A cell in the context of the invention is a set of wireless stations of a wireless network that are meant to communicate with each other. An example of a cell is an infrastructure network in which there is one station, called the access point, through which each station of the cell communicates. Another example of a cell is an ad-hoc network of stations that communicate with each other.

Each such cell is designed to have an area of coverage. To cover a large area, e.g., a building, many such cells are used.

The description described aspects of the invention applied to wireless local area networks that conform to the IEEE 802.11 standard. In particular, this description will be presented applied to the OFDM variants of the IEEE 802.11 standard, in particular applied to a station in an IEEE 802.11a conforming network, but is applicable to other wireless data networks, e.g., other networks conforming to the IEEE 802.11 standard such as those conforming to the 802.11b, 802.11g, or the new PHY standard being developed presently called 802.11n. The invention is also applicable to wireless data networks conforming to other standards.

One aspect of the invention provides for discriminating between an intra-cell packet and an inter-cell packet received at a station of a cell of a wireless network such as one conforming to the IEEE 802.11 network by including cell identification information in a packet transmitted by all stations of a cell. Another aspect of the invention provides for robust communication of the cell identification information by coding the cell identification information using a coding method. Let a first number of bits, denoted N1, be the number of bits provided for the cell identification information of the cell. According to this aspect, the N1 bits are encoded into coded form of a second number of bits, denoted N2, with N2 greater than N1, according to the coding method to provide for robust communication of the cell identification information.

Figure 1:
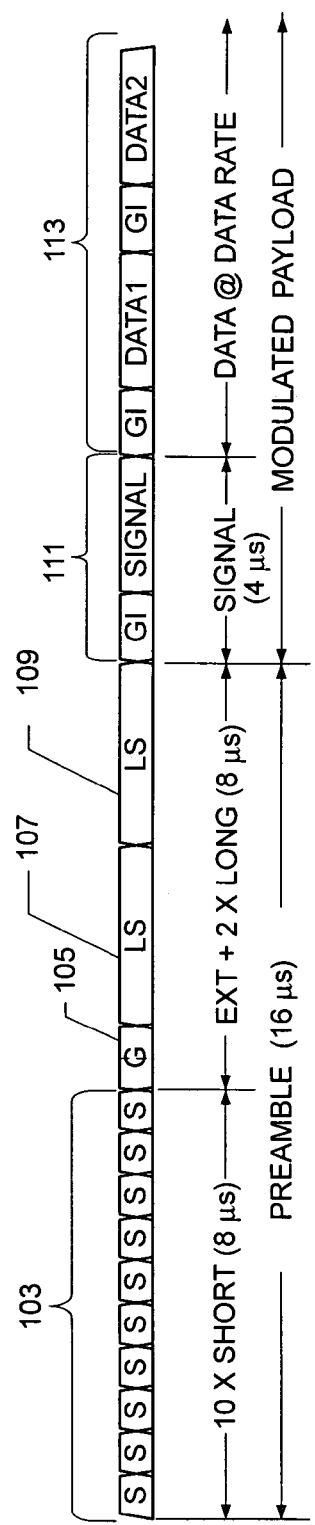
FIG. 1 shows in simplified form the structure of an IEEE 802.11a packet.

FIG. 1 shows the structure of an 802.11a packet. It starts with a 16 μs preamble that has a first part 103 of 10 short symbols and a second part of two long symbols 107, 109 and a guard interval 105. The short symbols are used for start-of-packet detection, selecting the best receive antenna (in the case antenna diversity is provided), automatic gain control (AGC), time synchronization, and frequency synchronization. The long symbol part is typically for channel estimation. The preamble 101 is followed by the modulated payload (the OFDM data) that has first field called the SIGNAL field 111 (including a guard interval) that is modulated at the lowest rate using BPSK modulation, and that contains information about how the remainder of the modulated payload is modulated at what data rate, and also about the duration of the remainder of the packet. The remainder of the packet is the data 113, and is modulated at the data rate as associated modulation specified in the SIGNAL field, e.g., one of 6, 9, 12, 18, 24, 36, 45, or 54 Mbps. Finally the data part 113 includes the MAC address, and the packet payload itself.

In many wireless networks where the deployment of client stations and access points is relatively dense, a wireless station (STA) that may be an access point or a client station typically receives packets from other STAs within its cell, and also from STAs in other cells. Those from other cells form co-channel interference. One prior art method of ascertaining if a packet is from within the cell or from another cell is to extract the MAC address from the OFDM data payload, and keep track of every MAC addresses within the cell. This prior art method has the following drawbacks:

1. The MAC address comes along relatively late in the packet, so it will take the receiving STA a relatively long time to recover that information.
2. The MAC address information is often coded at a very high data rate, up to 54 Mbps, so that the receiving STA may not be able to recover the required information at all.

According to another known method, sometimes called "message in message" or "stomp and restart," a receiving station remembers the signal strength of a received signal, but maintains its start-of-packet detection circuitry active. If another stronger signal arrives, the receiver aborts processing on the weaker signal and tries to demodulate the stronger signal.

An aspect of this invention provides a mechanism to convey cell-ID information earlier in the packet, and at a more robust data rate.

The 10 short symbols are denoted t0, t1, . . . , t9, and according the IEEE 802.11a standard, each exactly the same short symbol repeated 10 times. In one OFDM embodiment according to which each packet has a preamble that includes a plurality of short symbols, the last few short symbols are encoded such that each co-channel cell is given a different sequence. This forms the cell identification ("Cell-ID"). Then, the physical layer of the receiver can ascertain whether or not the received packet is from an intra-cell or inter-cell transmitter, i.e., whether or not the received cell includes the Cell-ID of the cell of the receiving station when all stations of the cell transmit packets that include the Cell-ID. If the packet if from an inter-cell transmitter, the receiver can terminate processing at the very beginning of the packet. This minimizes or at least reduces the amount of time that the medium would be otherwise occupied.

Figure 2A:
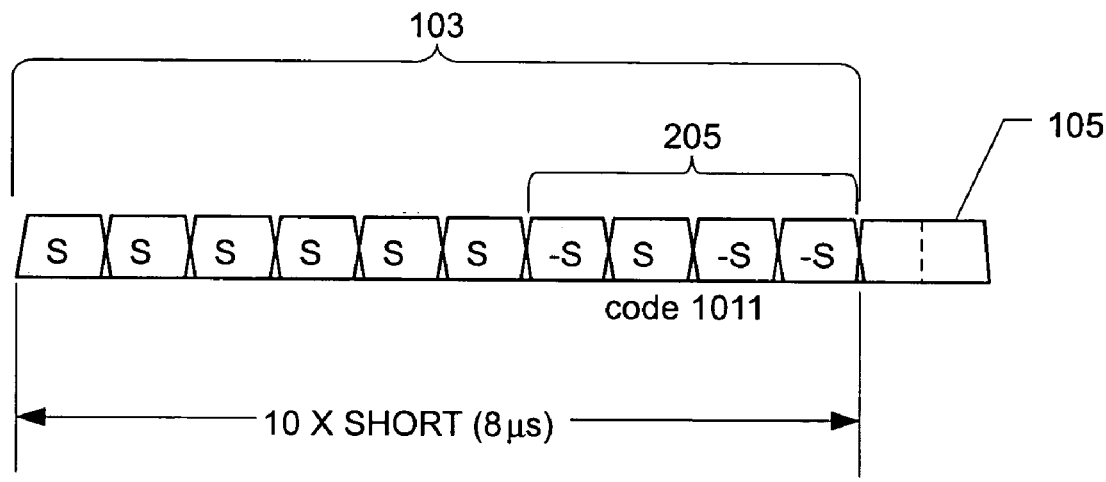
FIGS. 2A and 2B show two examples of Binary Phase Shift Keying (BPSK) encoding used on the last four short symbols to convey Cell-ID information according to an embodiment of the invention.
Figure 2B:
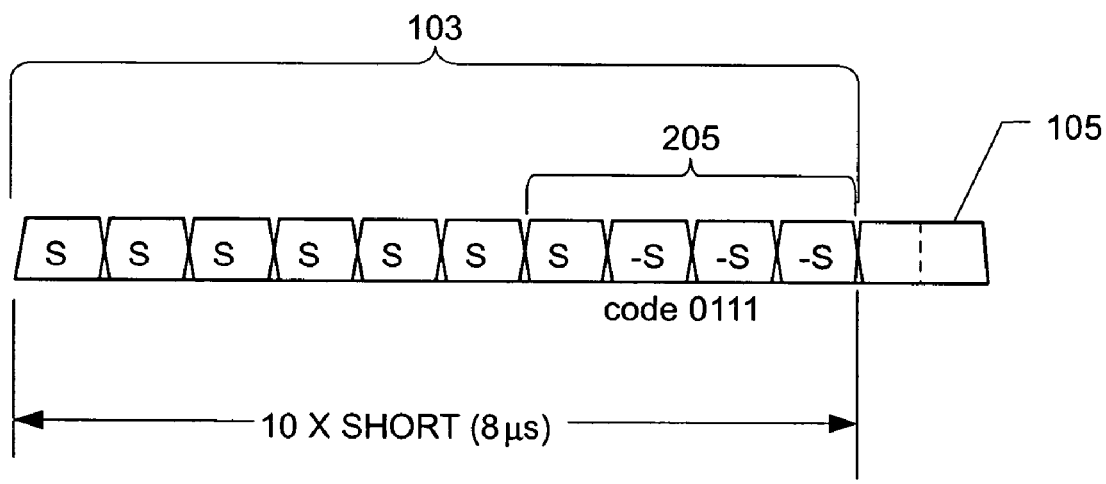

FIGS. 2A and 2B illustrate a first version of an embodiment of encoding Cell-ID information in the short symbols. According the first version, BPSK encoding is used on the last four short symbols 205. The sign of the amplitude of the short symbol is used for the encoding. When the sign of the short symbol is different from that of the first few short symbols, that represents a 1. When the sign of the short symbols is unchanged from that of the first few short symbols, that represents a zero. FIG. 2A shows the encoding for cells with a Cell-ID of 11 (code {1 0 1 1}), and FIG. 2B shows the encoding for cells with a Cell-ID of 7 (code {0 1 1 1}). Using this method, with the last four short symbols provides for distinguishing 16 cells.

Figure 3A:
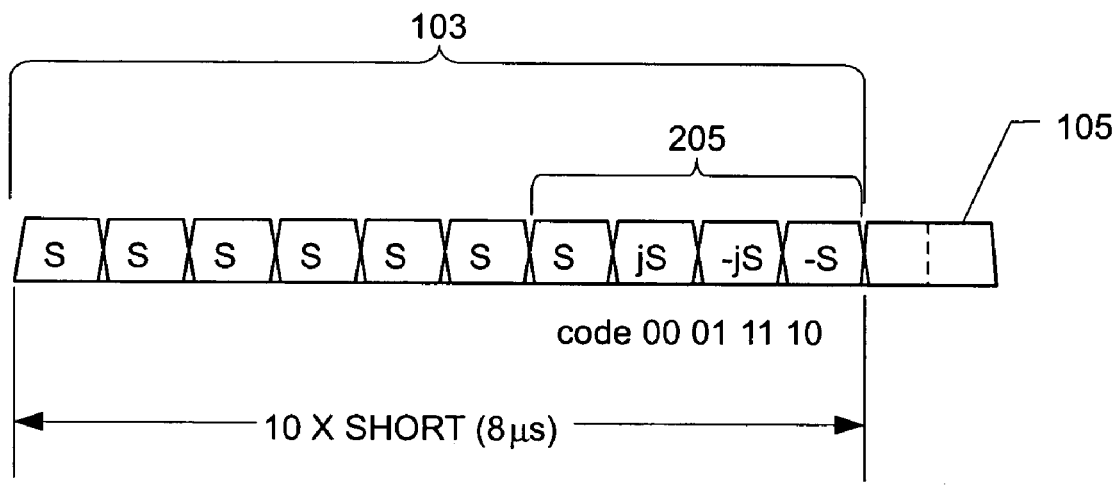
Figure 3B:
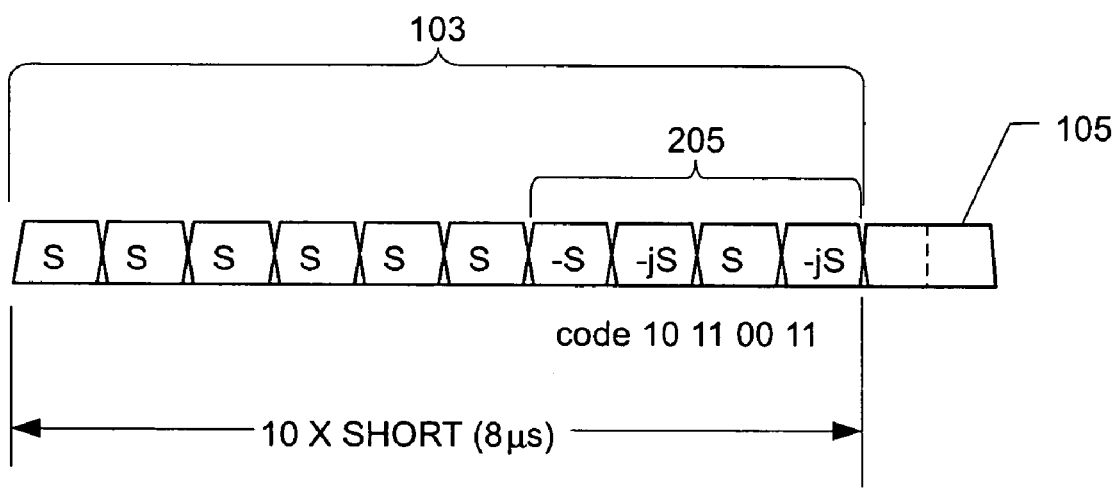

FIGS. 3A and 3B show a second version in which quarternary phase shift keying is used on the last four short symbols 205 to encode 8 bits of cell-ID information into these symbols. One embodiment uses the modulation technique shown in Table 1 below

TABLE 1

| Bits | phase shift (degrees) |
|------|-----------------------|
| 00   | 0                     |
| 01   | 90                    |
| 10   | 180                   |
| 11   | 270                   |

FIG. 3A shows the encoding for the Cell-ID code 00011110, while FIG. 3B shows the encoding for the Cell-ID code 10 11 00 11.

The Cell-ID encoded into the last few short symbols could be used to identify different cells on one channel, e.g., for an N-bit code, $2^N$ different cells. Thus, with QPSK in the last four short symbols, the Cell-ID can identify 256 different cells in the same conventional channel. In another version, the identifier for one of fewer than $2^N$ channels is encoded into an N-bit block code to convey the Cell-ID information in a more robust manner. Thus, with QPSK in the last four short symbols, the Cell-ID can identify 16, 32, 64, or 128 cells.

According to another embodiment wherein each packet includes a field that provides information on how the packet is encoded, the field according to the standard including reserved or empty bits, some or all of the reserved or empty bits in the field of a packet transmitted by a station of a cell convey the cell identification information of the cell.

Figure 4A:
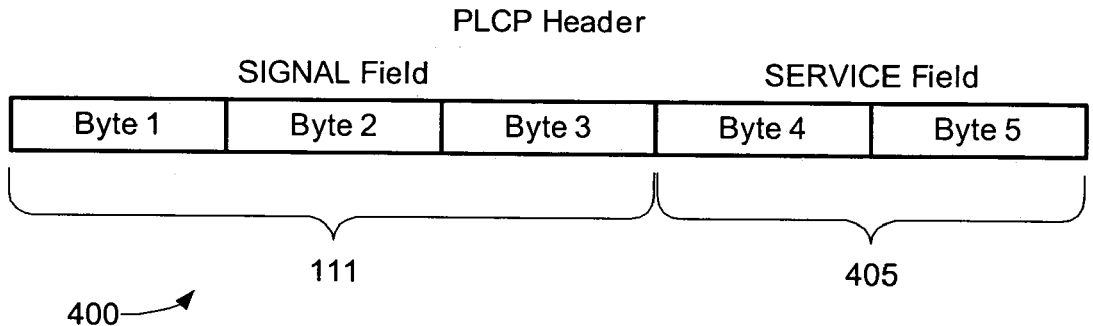
FIG. 4A shows a Physical Layer Control Protocol (PCLP) header that conforms to the OFDM variants of the IEEE 802.11 standard.

FIG. 4A shows a PCLP header 200 that conforms exactly to the OFDM variants of the IEEE 802.11 standard. While the PLCP header shown in FIG. 4A is prior art, such a header that includes Cell ID information as described herein is not prior art. The PCLP header 400 starts with the 3-byte SIGNAL field 111 that is modulated at a low data rate, in particular, SIGNAL is modulated at BPSK at rate ½ and provides information about the packet, including the data rate at which the rest of the packet in encoded.

The SIGNAL field 111 is followed by a 2-byte SERVICE field 405 that is modulated at the payload data rate specified in SIGNAL. The remainder of the packet—the PLCP Service Data Unit (PSDU)—includes DATA at the payload data rate specified in the SIGNAL field 111.

Figure 4B:
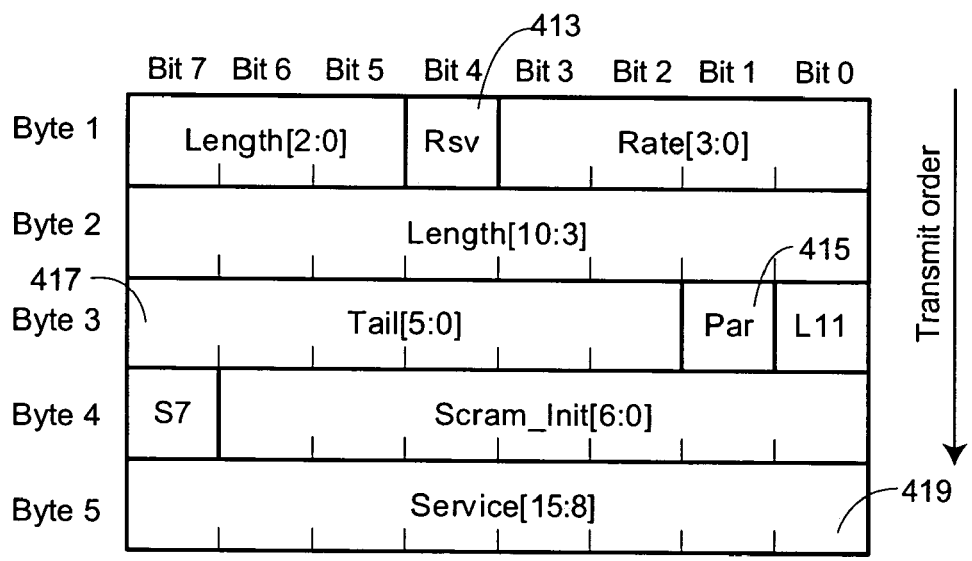
FIG. 4B shows the individual bits of the 5-byte PCLP header that conforms to the OFDM variants of the IEEE 802.11 standard.

FIG. 4B shows the individual bits of the 5-byte PCLP header. While the PLCP header shown in FIG. 4B is prior art, such a header that includes Cell ID information as described herein is not prior art. The SIGNAL field 111 includes RATE field of 4 bits denoted Rate[0] through Rate[3] that provide information on the data rate. The RATE information determines the coding rate and the modulation method used. The RATE field is followed by a reserved bit 413 that is always 0, and a 12-bit LENGTH field whose bits are denoted Length[0] through Length[11]. The LENGTH field is followed by a parity bit 415. This is followed by 6-tail bits 417 of the SIGNAL field denoted Tail[0] through Tail[5] that are unused bits that should be 0. Note that the SIGNAL field includes legal combinations. Consider the RATE field. There are 4 bits, i.e., 16 combinations, but only 8 are expected for a fully conforming packet. The LENGTH field similarly has illegal combinations, e.g., values above 1600.

One embodiment uses unused bits in the SIGNAL field 111 to provide for conveying Cell-ID information. The reserved bit 413 together with unused (illegal) combinations of the RATE and LENGTH fields provide for cell ID. Thus, according to this embodiment, the reserved bit 413 is used to indicate whether Cell-ID information is incorporated into the SIGNAL field 111, and if so, the Cell-ID information is extracted from the combination of the RATE and the LENGTH fields.

According to another embodiment, the packets conform to a specification related to the OFDM variants of the IEEE 802.11 standard. According to such a related specification, that may, in time, become a new OFDM variant of the IEEE standard, the SIGNAL field not only provides information on how the remainder of the packet is the remainder of the packet is encoded, but also provides for conveying the Cell-ID information. This additional information may be in an included second SIGNAL field, or in a single extended SIGNAL field, and the term "extended SIGNAL field" means either a field such as the 802.11a SIGNAL field together with a second SIGNAL field, or the extension to the 801.11a SIGNAL field. The second SIGNAL field is also modulated at the same low rate as the first SIGNAL field. Such a extended SIGNAL field includes the Cell-ID information. In alternate embodiments the extended SIGNAL field also includes one or more of the number of spatial channels being used (see below for spatial processing), the number of frequency channels being used, and additional modulation type information. One particular embodiment includes in the extended SIGNAL field 6 bits for the Cell-ID. 4 bits for the mod type, 3 bits for the spatial channels, 3 bits for the number of frequency channels, and possibly more information unrelated to this invention.

According to yet another embodiment, bits in the modulated part of the packet that according to the standard being used are empty or reserved are used to convey cell identification information to provide for differentiating between co-channel cells. In particular, for the OFDM variants of the IEEE 802.11 standard, some of the SERVICE field bits are so encoded.

The three-byte SIGNAL field 111 is followed by the two-byte SERVICE field 405 that includes 7 random scrambler initialization bits denoted Scram_Init[0] through Scram_Init[6], and nine SERVICE field 419 bits denotes Service[7] through Service[15]. The latter are unused bits that should all be zero to conform exactly to the OFDM variants of the IEEE 802.11 standard.

One embodiment of the invention uses all or some of the 9 unused bits Service[7] through Service[15] to convey Cell-ID information. If all 9 bits are used, up to 512 cells can be identified on a single channel. In another version, a Cell-ID of fewer than 9 bits is encoded into the 9 bits using a block code, in yet another version, fewer than 9 bits of Service[7] through Service[15] are used to convey the Cell-ID information. One version uses a single byte of information, Byte 5 shown in FIG. 4B, i.e., bits Service[8] through Service[15]. One implementation uses these 8 bits to identify up to 256 different cells in the same channel, while another uses a Cell-ID of fewer than 8 bits block coded into the 8 bits Service[8] through Service[15] to convey the bits in a more robust manner.

Note that FIGS. 4A and 4B are prior art for a packet that exactly conforms to one of the OFDM variants of the IEEE 802.11 standard, they are not prior art when the Cell-ID is encoded into the service bits.

The method of encoding the Cell-ID into unused bits in the service bits of the packet header has two disadvantages over the first method of encoding at least some of the short symbols. Firstly, the short symbols are in the preamble and thus may be determined earlier than the service bits in the PLCP header. Secondly, the service bits are encoded and modulated at the data rate of the packet, which may be as high as 54 Mbps. A STA receiving these bits from a co-channel interferer may be attempting to decode the bits in a weak signal, and therefore may make errors in so decoding the information.

Another aspect of the invention is a wireless receiver that includes a signal processor that can ascertain whether or not a packet is from its own cell or from a co-channel interfering cell using the Cell-ID information conveyed in the packet using one of the methods described above.

Figure 5:
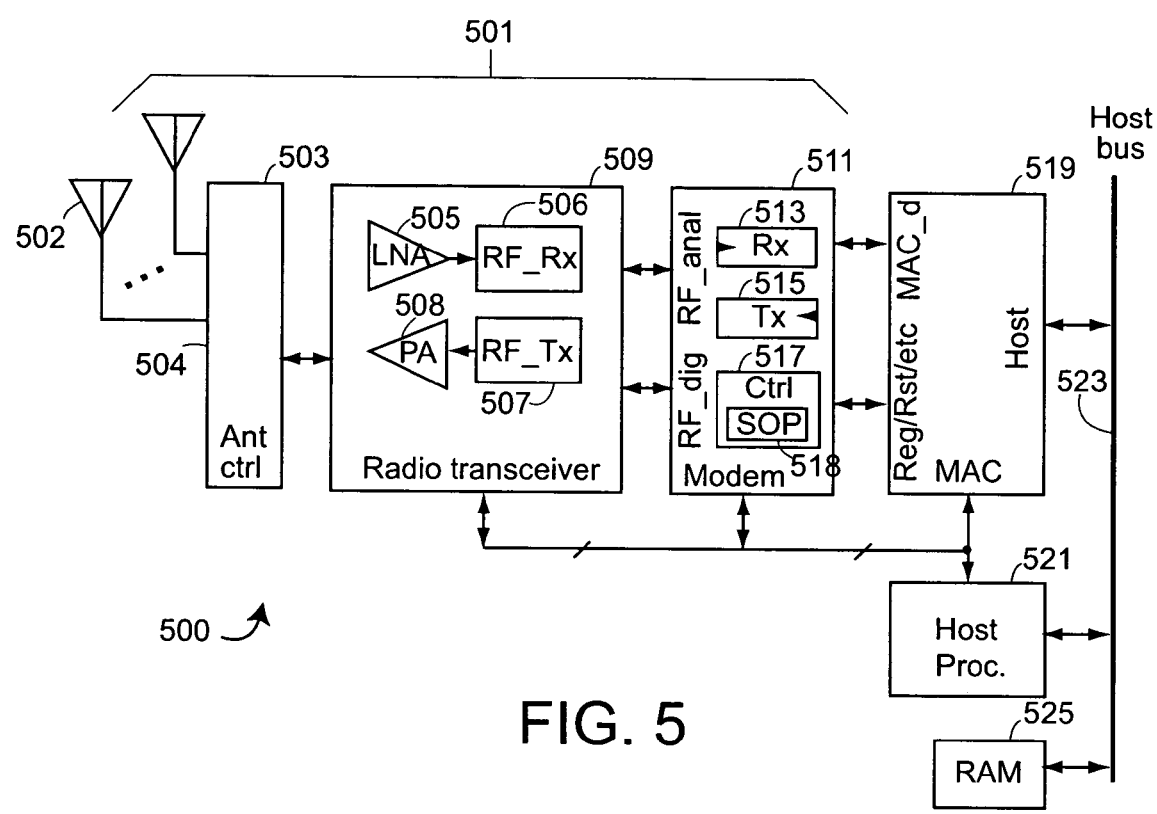
FIG. 5 shows a block diagram of a wireless station that includes an embodiment of the present invention.

FIG. 5 is a functional block diagram of a wireless network node 500 that includes an embodiment of present invention. The node 500 might be, for example, implemented on a PCMCIA wireless LAN card, and includes a physical layer interface (PHY processor) 501 that includes an antenna subsystem 502 with at least one antenna for the frequency or frequencies of service (e.g., approx. 2.4 GHz and/or approx. 5 GHz), and an antenna subsystem 503 that for the case of half-duplex operation includes a transmit/receive (T/R) switch, and for the case of diversity, includes a diversity switch to select an antenna. The antenna subsystem is coupled to a radio transceiver 509 that in one embodiment is implemented as a single chip. The receive chain of the transceiver includes a low-noise amplifier (LNA) 506 and receiver radio frequency (RF) electronics 506. The transmit part of the transceiver 509 includes transmit RF electronics 507 and a power amplifier (PA) 508. The transceiver provides an analog received signal to and accepts an analog signal for transmission from a modem 511 that includes a receiver part 513, a transmitter part 515, and a control part 517 that, for example, includes a start-of-packet (SOP) detector 518 that has a settable signal strength level such that signals of strength below the settable threshold do not trigger the start of packet detector. The control part 517 further implements, automatic gain control, and aspects of the invention, including determining any Cell-ID information conveyed in a received packet, and in another aspect, ascertaining if the packet is from a different cell than this node belongs to. The receiver part includes a start-of-packet detector that has a settable signal strength level such that signals of strength below the settable threshold do not trigger the start of packet detector. The modem is coupled to the radio transceiver via an RF analog interface for the received signal and signal for transmission, and via an RF digital interface for such control signals as gain control and status.

The system 500 further includes a medium access controller (MAC) processor 519 for layer-2 processing. The MAC processor accepts payload data from the modem, and provides payload data to the modem 511 via a data interface. The MAC processor further is connected to the modem 511 via a digital interface that provides access to the MAC processor of various status and data registers in the modem 511.

In one embodiment, the MAC processor is coupled to a host processor 521 via a host bus subsystem 523. While FIG. 5 shows a separate host processor, the host processor function may in other embodiments be incorporated with the MAC processor 519. In one embodiment, a memory, e.g., a random access memory element (RAM) 525 is included for program storage. The memory 525 may be directly coupled to the host or to the MAC processor or to both. There may also be additional memory, e.g., for buffering, and for simplicity, such additional memory will be assumed to be included in memory 525. One or more interfaces may be included, e.g., one or more interfaces that conform to well-known industry standards PCMCIA, PCI, USB, and so forth.

Some embodiments may use antenna diversity, e.g., two or more transmit antennas or two or more receive antennas or multiple antennas for both receiving and transmitting. The diversity may be provided by spatial diversity, or by having different polarizations at the antennas, and so forth. The antennas may be switched or combined. Such processing is known to improve performance in environments that include fading, and may even be used to provide spatial division multiple access (SDMA).

One embodiment of system 500 is compatible with one or more variants of the IEEE-802.11 standards for wireless local area network (LAN) applications. The RF transceiver 509 and modem 511 constitute a complete wireless engine for OSI Layer-1 physical layer (PHY) functionality for one or more of the IEEE-802.11 PHY variants, and the (MAC) 519 is substantially IEEE-802.11-compatible.

Figure 6:
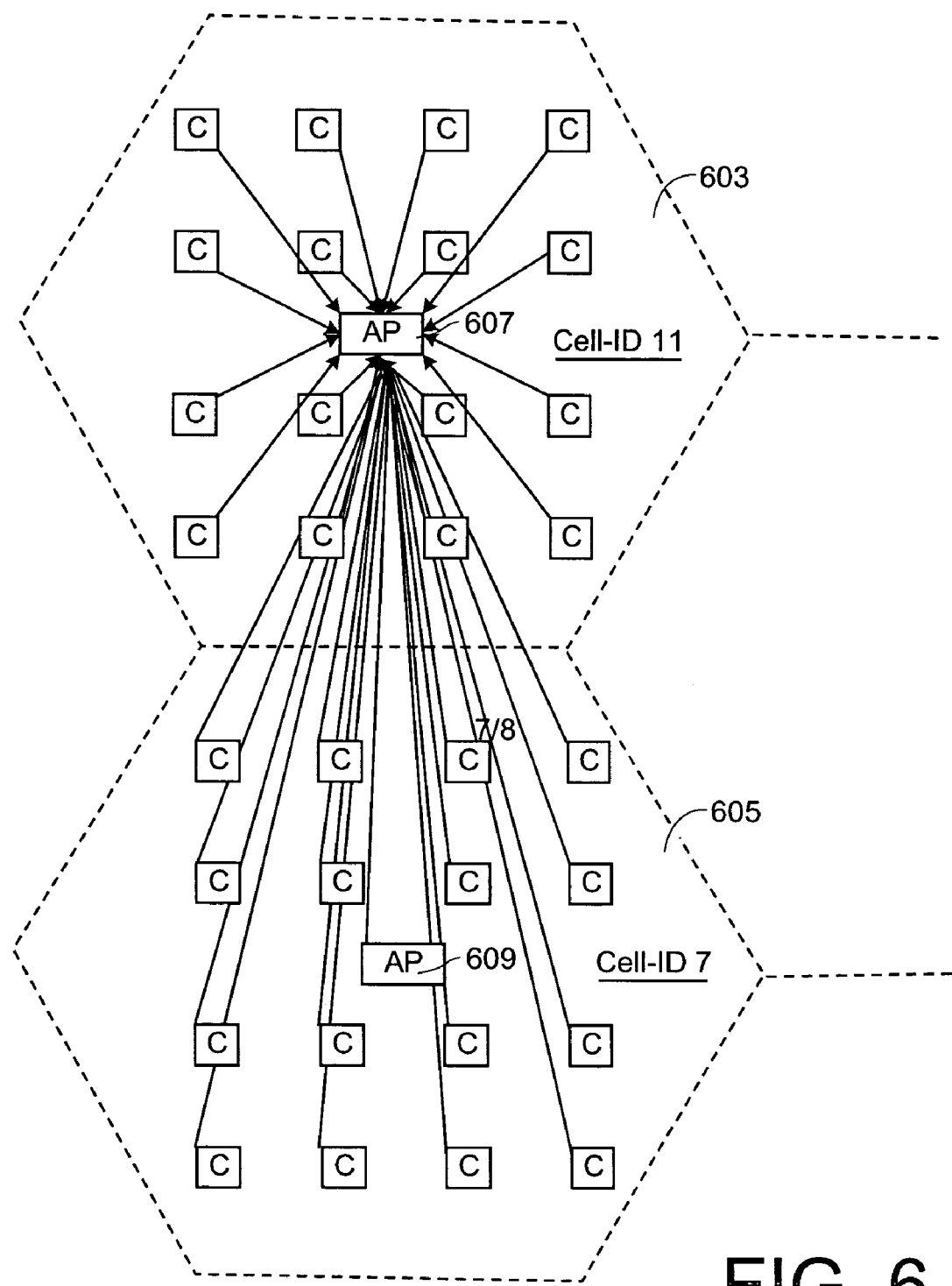
FIG. 6 shows two cells of an example wireless network.

FIG. 6 shows two cells in simplified form—adjacent cells in this example—including a first cell 603 with Cell-ID 11 and a second cell 605 with Cell-ID 7. The access point (AP) 607 and all the client stations (marked C) in the first cell 603 transmit packets that convey Cell-ID 11. Similarly, the access point 609 and all the client stations (also marked C) in the second cell 605 transmit packets that convey Cell-ID 7. Different embodiments use the respective different Cell-ID conveying methods described above. It may be that some of the clients from cell 605 and/or the AP 609 with Cell-ID 7 transmit signals that are strong enough to trigger a start-of-packet event at the access point 607 in cell 603 (Cell-ID 11). Similarly, it may be that some of the clients of cell 603 transmit signals strong enough to trigger a start-of-packet event at the access point 609 in cell 605 (Cell-ID 7).

Another aspect of the invention is the receiving station using information of received packets that are ascertained to be not from other stations of the same cell as the station to mitigate interference from such other stations that are not of the cell.

Figure 7:
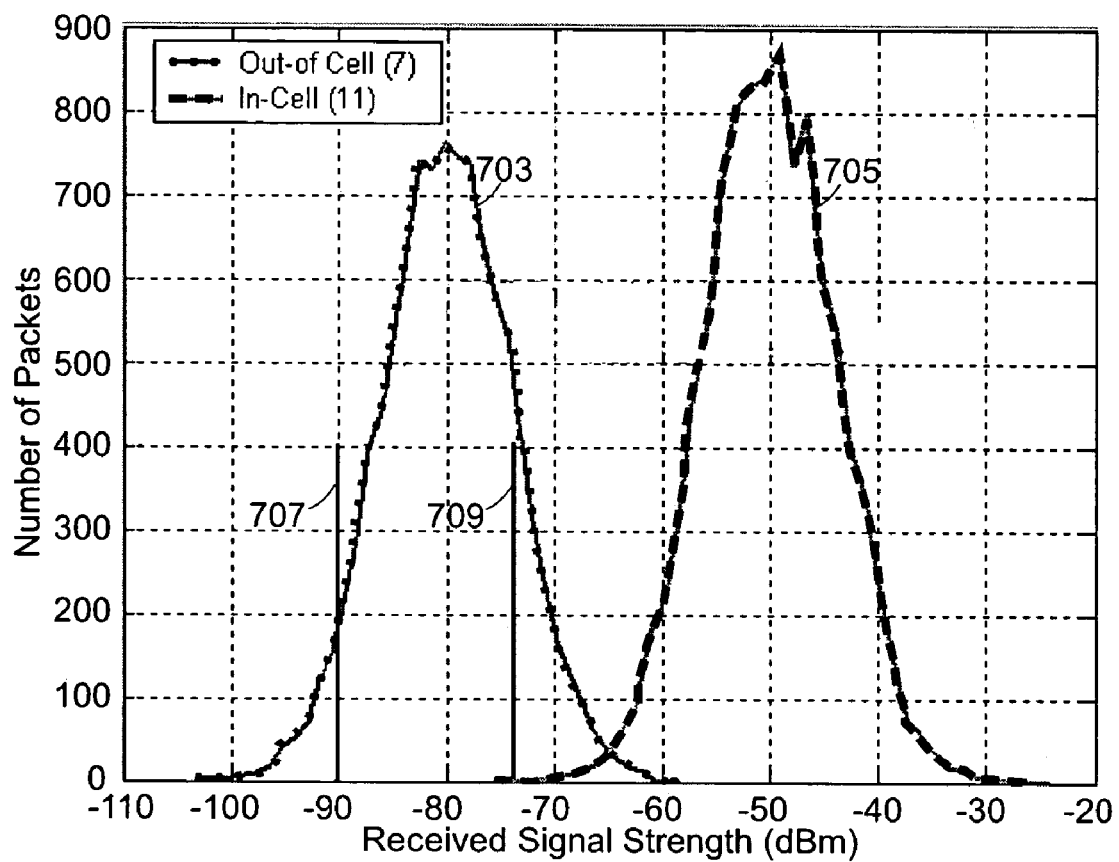
FIG. 7 shows an example signal strength distribution from two cells and a Start of Packet (SOP) threshold varying over two discrete times according to an aspect of the invention.

Referring to FIG. 5, the modem of the station includes a start-of-packet (SOP) detector that has a settable signal strength level such that signals of received signal strength below the settable threshold do not trigger the start of packet detector. The received signal strength is indicated by a received signal strength indication (RSSI) in the receiver part 506 of the transceiver 509. Thus each station of the cell has a start-of-packet threshold such that packets that are stronger than the threshold are processed, and those weaker than the threshold are not. One aspect of the invention is to adjust the SOP threshold according to the signal strengths of one or more received at the station and ascertained not to be from other stations of the cell. FIG. shows the signal strength distributions (numbers of packets arriving as at each received signal strength) at the access point 607 and illustrates how cell-ID information is used to adjust the start-of-packet threshold for the two cells shown in FIG. 6 according to this aspect of the invention. The distribution of received signal strength from signals arriving from cell 605 having Cell-ID 7 is shown as curve 703, while the distribution of energy from signals arriving from cell 603 having Cell-ID 11 are shown as curve 705. A typical receiver of a station conforming to the IEEE 802.11a standard is capable of detecting relatively weak signals. It will reliably detect any signal stronger than the Start of Packet threshold shown in the figure. When initially adjusted, FIG. 7 shows that the SOP detector of the receiver of AP 607 has a threshold 707 that will allow the receiver to detect all signals arriving from stations of cell 603 (Cell-ID 11), and almost all signals arriving from stations of cell 605 (Cell-ID 7). Over a period of time, the receiver of AP 607 adjusts the SOP threshold as more and more packets are ascertained to not be from cell 603. After a settable period of time, or according to another embodiment, after a settable number of out-of-cell packets are detected, the SOP threshold is adjusted to a new value 709 to prevent the receiver of AP 607 from being triggered by the majority of signals from cell 605. This should improve the throughput of traffic within the cell 603.

Figure 8:
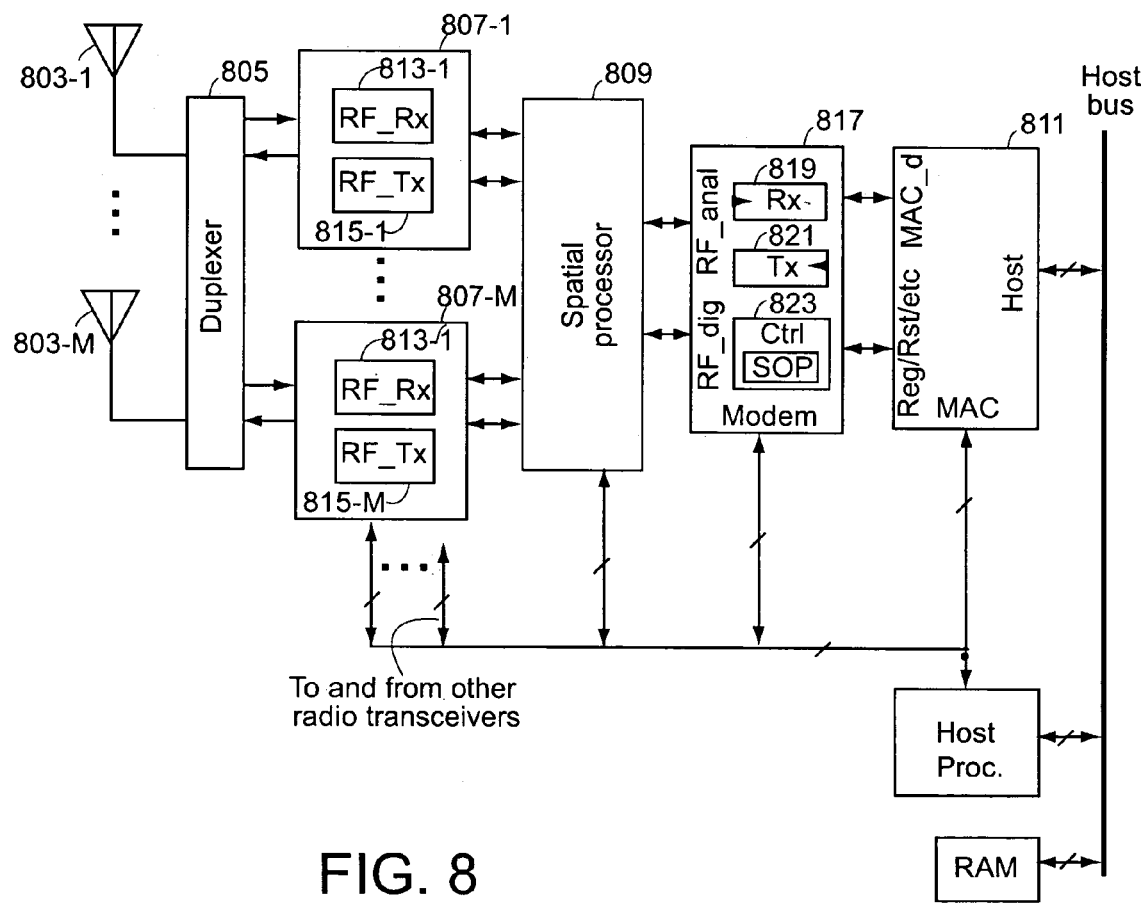
FIG. 8 shows a block diagram of a wireless station with adaptive smart antenna processing that, according to another aspect of the invention, uses Cell-ID information to mitigate interference.

FIG. 8 shows a wireless station that includes an array of antenna elements, a set of radio receivers coupled to the array of antenna elements, and a spatial processor coupled to the radio receivers able to form a received signal according to an adaptive smart antenna processing strategy. It is known to use adaptive smart antenna processing in a communication station equipped with multiple antennas to either reject interference when receiving from a another station (i.e., on the uplink for the particular station) or to deliver power in a spatially or spatio-temporally selective manner when transmitting from the station to another station (i.e., on the downlink from the particular station).

According to yet another aspect of the invention, a receiver such as shown in FIG. 8 receives a packet. The receiver is part of a cell where all stations communicate using packets that include cell identification information, e.g., as according to any of the embodiments described above. Thus, such a station can ascertain whether or not a received packet is from an in-cell station. Once such a packet is ascertained to be from an out-of-cell station, i.e., from a co-channel interferer, the smart antenna processing uses a receive strategy that mitigates interference from such an out-of-cell interferer.

After data from interferers have been collected, e.g., in a settable time period, or after a settable number of interfering packets have been received, different smart antenna processing strategies may be used to mitigate interference in different ways. Some of these include:

Maximizing the signal energy for signals received from in-cell stations while maintaining the signal energy from out of the cell signals constant, the signal energy according to a measure of energy.

Minimizing the signal energy from signals received from out-of-cell stations while maintaining the signal energy from in-cell signals constant, the signal energy according to a measure of energy.

Maximizing the ratio of energies of signals from in-cell stations to energies of signals from out-of-cell stations, the signal energy according to a measure of energy.

Minimizing the probability of a SOP event being triggered from packets that are out-of-cell.

Steering nulls towards stations that are known to be out-of-cell interferers based on packets previously received from such stations that are ascertained to be out-of-cell.

FIG. 8 shows a communication station with M antenna elements in the antenna array. While systems having some elements similar to that shown in FIG. 8 may be prior art, a system such as that of FIG. 8 implementing aspects of the present invention is not prior art.

In the system of FIG. 8, a transmit/receive ("TR") switch 805 is connected between an antenna array of M antenna elements 803-1, . . . , 803-M coupled to a set of M radio receivers and transmitters (transceivers) 807-1, . . . , 807-M, each of which includes a receive electronics 813-1, . . . , 813-M, respectively, and transmit electronics 815-1, . . . , 815-M, respectively. In the embodiment shown, the station uses the same antenna array for transmit and receive, such that the antenna elements are coupled to the transceivers via a duplexer 805 used to selectively connect one or more elements of the antenna array to the transmit electronics 815-1, . . . , 815-M when in the transmit mode and to receive electronics 813-1, . . . , 813-M when in the receive mode. An alternate embodiment provides for full duplex operation.

Parts of the receive electronics 813-1, . . . , 813-M and transmit electronics 815-1, . . . , 815-M are implemented using analog electronics, and other parts, in digital electronics. In one embodiment, the outputs of receive electronics 813-1, . . . , 813-M generate digitized signals as input to a spatial processor 809. The spatial processor 809 incorporate software and/or hardware for implementing the smart antenna processing strategy. In receive mode, the spatial processor 809 forms a received signal formed according to a smart antenna receive processing strategy. The formed signal is input to a modem 817 and then to a MAC processor 811. In transmit mode, the modem 817 receives a signal from the MAC processor 811 and forms a signal for transmission that is input to the spatial processor 809. The spatial processor 809 then forms a set of signals for transmission formed according to a smart antenna transmit processing strategy. These signals are input to the transceivers 807-1, . . . , 807-M.

Note that while FIG. 8 shows a transceiver in which the same antenna elements are used for both reception and transmission, it should be clear that separate antennas for receiving and transmitting may also be used, and that antennas capable of only receiving or only transmitting or both receiving and transmitting may be used with adaptive smart antenna processing.

According to an aspect of the invention, after the station receives a packet that is ascertained not to be from the cell of the station, the station stores information on the received signal of the packet and uses such stored information to mitigate interference when receiving. According to another aspect of the invention, after the station receives a packet that is ascertained not to be from the cell of the station, the station stores information on the received signal of the packet and uses such stored information to transmit in such a manner so as to lower the likelihood that the station that might have sent the interfering packet receives the transmission.

One embodiment of the invention uses linear spatial processing for the adaptive smart antenna processing. During uplink communication, amplitude and phase adjustments are applied, typically but not necessarily in baseband to each of the signals received at the antenna array elements to select (i.e., preferentially receive) the signals of interest while minimizing any signals or noise not of interest—that is, the interference.

Such baseband amplitude and phase adjustment can be described by a complex valued weight, the receive weight, and the receive weights for all elements of the array can be described by a complex valued vector, the receive weight vector. Similarly, the downlink signal is processed by adjusting the amplitude and phase of the baseband signals that are transmitted by each of the antennas of the antenna array. Such amplitude and phase control can be described by a complex valued weight, the transmit weight, and the weights for all elements of the array by a complex valued vector, the transmit weight vector.

In some systems, the receive (and/or transmit) weights include temporal processing, and in such cases, the receive (and/or transmit) weights may be functions of frequency and applied in the frequency domain or, equivalently, functions of time applied as convolution kernels. Alternatively, each convolution kernel, if for sampled signals, may itself be described by a set of complex numbers, so that the vector of convolution kernels may be re-written as a complex values weight vector, which, for the case of there being M antennas and each kernel having K entries, would be a vector of KM entries.

Many methods are known for determining the spatial processing for interference rejection in receive mode or selective power delivery in transmit mode. Examples include least-squares beam forming and zero-forcing beam forming. Selective power delivery must balance competing goals. In general, the power delivered to one remote user cannot be simultaneously maximized while the power delivered to another remote user is minimized. More generally, if several remote users require power minimization (i.e., nulling), the relative power delivered to each must be traded off. This tradeoff can be based on a number of factors. For example, for a given interferer (which might be a co-channel user), a deeper null (i.e., decreased transmitted power aimed at an interferer during transmission or decreased sensitivity to signals transmitted from the interferer during reception) may be required for a remote user co-participating in the spatial channel established at the particular communication station than for a remote user communicating with a different particular communication station.

With zero-forcing methods, the particular station to has knowledge of the spatial signatures (or spatio-temporal signatures) of the other station, e.g., the interferer. The receive spatial signature and the receive spatio-temporal signature characterizes how the particular station's antenna array receives signals from a particular subscriber unit in the absence of any interference or other subscriber units. The transmit spatial signature and the transmit spatio-temporal signature of a particular remote user characterizes how another station receives signals from the particular station in the absence of any interference. See U.S. Pat. No. 5,592,490 entitled SPECTRALLY EFFICIENT HIGH CAPACITY WIRELESS COMMUNICATION SYSTEMS, to Barratt et al., incorporated herein by reference, and U.S. Pat. No. 5,828,658 entitled SPECTRALLY EFFICIENT HIGH CAPACITY WIRELESS COMMUNICATION SYSTEMS WITH SPATIO-TEMPORAL PROCESSING, to Ottersten et al., also incorporated herein by reference, for spatial processing and spatio-temporal processing methods that use spatial and spatio-temporal signatures. Note that because a signature may be a spatial signature or a spatio-temporal signature, depending on whether the smart antenna processing is spatial or spatio-temporal, the term signature will be used herein, and whether the signature is spatial or spatio-temporal will depend on whether the processing is spatial or spatio-temporal, and whether the signature is a transmit or a receive signature will depend on the context, and which signature will be clear to those of ordinary skill in the art from the context.

Embodiments of the invention determine the signatures of remote transmitters that are ascertained to be interferers from the Cell-ID information (or lack thereof).

Methods are known for directing precise and deep nulls on the. uplink or downlink direction. Methods also are known for estimating one or more signatures in the direction of one or more interferers to use, for example, for such null deepening. Methods are known for using a signature estimate of an interferer for directing precise and deep nulls in the direction of the interferer. Methods are known for directing precise and deep nulls in the direction of one or more interferers while substantially maintaining the other nulling and gain patterns of a provided adaptive smart antenna processing strategy. See for example, U.S. patent application Ser. No. 20020013164 to Leifer et al titled NULL DEEPENING FOR AN ADAPTIVE ANTENNA BASED COMMUNICATION STATION that describes a method for determining, in a communication station using multiple antennas, improved uplink or downlink processing strategies, for example in the form of uplink or downlink weights for linear smart antenna processing, for which one or more nulls have a controlled depth. The method can be applied as a modification to a variety of known techniques for uplink and downlink strategy computation. The method needs as side information only the signatures of those remote users to which controlled nulls are to be directed. Other nulls in the array pattern, for which no signature estimates may be available, are substantially preserved.

In addition to the methods described in the above-referenced U.S. Pat. Nos. 5,592,490 and 5,828,658 that use spatial and spatio-temporal signatures, other methods also are known for determining the weighting vectors to be applied when processing received signals in order to achieve interference mitigation. These include methods that determine the directions of arrival of signals from subscriber units, and methods that use the spatial or spatio-temporal characteristics of subscriber units, for example, the spatial or spatio-temporal signatures. See for example U.S. Pat. Nos. 5,515,378 and 5,642,353, entitled "SPATIAL DIVISION MULTIPLE ACCESS WIRELESS COMMUNICATION SYSTEMS", to Roy, et al., incorporated herein by reference, for methods that use directions of arrival.

"Blind" methods also are known that determine the weights from the signals themselves, but without resorting to a priori knowledge such as training signals or silent periods, that is, without determining what weights can best estimate a known symbol sequence (or in the case of the period silence, the absence of a known sequence). Such blind methods typically use some known characteristic of the signal transmitted by the subscriber unit to determine the best receive weights to use by constraining the estimated signal to have this property, and hence are sometimes referred to as property restoral methods.

Property restoral methods in turn can be classified into two groups. Simple property restoral methods restore one or more properties of the signal without completely reconstructing the modulated received signal, for example by demodulating and then re-modulating. More complex restoral methods typically rely upon reconstruction of the received signal.

Property restoral methods determine a signal (a "reference signal") that is constrained to the required property and then determine a set of weights corresponding to the reference signal, such that if the reference signal was transmitted by a remote user, the signals at the antenna elements of the receiving array would be acceptably "close" to the signals actually received. One example of a simple restoral method is the constant modulus (CM) method, which is applicable to communication systems that use a modulation scheme having a constant modulus, including, for example phase modulation (PM), frequency modulation (FM), phase shift keying (PSK) and frequency shift keying (FSK). The CM method has also been shown to be applicable to non-CM signals. Other partial property restoral techniques include techniques that restore the spectral properties of the signal, such as the signal's spectral self-coherence.

"Decision directed" (DD) methods construct a reference signal by making symbol decisions (e.g., demodulating) the received signal. Such decision directed methods use the fact that the modulation scheme of the transmitted subscriber unit signal is known, and then determine a signal (a "reference signal") that is constrained to have the characteristics of the required modulation scheme. In such a case, the reference signal production process includes making symbol decisions. Weights are determined that produce a reference signal, that if transmitted by a remote user, would produce signals at the antenna elements of the array that are acceptably "close" to the signals actually received. For descriptions of systems that use decision directed weight determination methods, see, for example, U.S. Pat. No. 5,909,470 to Barratt, et al., titled "METHOD & APPARATUS FOR DECISION DIRECTED DEMODULATION USING ANTENNA ARRAYS & SPATIAL PROCESSING" to Barratt, et al., and U.S. Pat. No. 6,275,543 to Petrus, et al, titled "METHOD, FOR REFERENCE SIGNAL GENERATION IN THE PRESENCE OF FREQUENCY OFFSETS IN A COMMUNICATION STATION WITH SPATIAL PROCESSING" both of which are hereby incorporated herein by reference, for descriptions of systems that use decision directed weight determination methods.

Weight determining schemes also are known that use training data, that is, data whose symbols are known a priori. The training data (possibly with a timing offset or frequency offset, or both applied) is then used as a reference signal to determine the smart antenna processing strategy (e.g., the weights). Therefore, reference signal based methods include the case in which the reference signal includes training data, the case in which the reference signal includes a signal constrained to have some property of the transmitted signal, and the case in which the reference signal includes constructing a signal based on making symbol decisions.

Non-linear uplink and downlink processing strategies also are known. In the uplink direction, such methods typically include demodulation and act to determine an estimate of the symbols transmitted by a desired other station from the set of signals received at the antenna elements of the communication station. One known example of such a processing scheme is based on a Viterbi algorithm using branch metrics. In this regard, it is noted that the present invention is not limited to linear spatial and spatio-temporal processing methods that include weight determining, but also is equally applicable to non-linear methods such as those based on Viterbi algorithms and branch metrics, which may not necessarily include determining weights.

The following patents also describe smart antenna processing for interference mitigation: U.S. Pat. No. 6,101,399 to Raleigh, et al. titled "ADAPTIVE BEAM FORMING FOR TRANSMITTER OPERATION IN A WIRELESS COMMUNICATION SYSTEM;" U.S. Pat. No. 6,144,711 to Raleigh, et al. titled "SPATIO-TEMPORAL PROCESSING FOR COMMUNICATION;" U.S. Pat. No. 6,452,981 to Raleigh ; et al. titled "SPATIO-TEMPORAL PROCESSING FOR INTERFERENCE HANDLING;" U.S. Pat. No. 6,377,631 to Raleigh titled "TRANSMITTER INCORPORATING SPATIO-TEMPORAL PROCESSING;" and U.S. Pat. No. 6,442,130 to Jones, IV , et al. titled "SYSTEM FOR INTERFERENCE CANCELLATION."

Thus, conveying Cell-ID information in packets transmitted by other stations in a cell can be used to mitigate interference from out-of-cell transmitters.

Furthermore, according to another embodiment, the smart antenna null-steering technique is combined with the method described above for adjusting the SOP threshold to achieve further interference mitigation.

Another aspect of the invention is a method for transmitting packets that convey Cell-ID information, such that another station receiving such a transmitted packet can ascertain whether or not the received transmitted packet is of the same cell as the receiving station. Different embodiments of conveying the Cell-ID information use the different techniques for conveying the information as described above.

Thus various embodiments have been described for conveying Cell-ID information, and for using such information.

Embodiments are described herein according to which the cell identification information is encoded in the last four short symbols of a preamble of a packet of a wireless network that conforms to one of the OFDM variants of the IEEE 802.11 standard. It would be clear to those in the art that alternate embodiments encode the cell identification information in a different number and a different set of the short symbols. It also would be clear to those in the art that other encoding methods also may be used. It also would be clear to those in the art that other standards also use packets that have a preamble that preceded the modulated information, and that the invention may be used in a wireless network that uses such other standard by encoding the cell identification information into the preamble.

Embodiments of the invention were described above as methods. Referring to FIGS. 5 and 8, the modem implements such methods. Some modem embodiments include one or more processor and each of the methods described herein may be implemented in the form of a computer program that executes on such a processor that are part of a wireless station. Similarly, the smart antenna processing methods may be implemented by a computer program that operates on a processor. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium. Any suitable computer readable medium may be used including a magnetic storage device such as a diskette or a hard disk, or an optical storage device such as a CD-ROM.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

While embodiments has been described for operation with a wireless network receiver that operates according to the OFDM variants, e.g., the 802.11a and 802.11g variants of the IEEE 802.11 standard, the invention may be embodied in receivers and transceivers operating in other standards than the IEEE 802.11 OFDM standards, for example other WLAN standards and other wireless standards where packets conveying Cell-ID information would be beneficial. Applications that can be accommodated include IEEE 802.11 wireless LANs and links, wireless Ethernet, HIPER-LAN 2, European Technical Standards Institute (ETSI) broadband radio access network (BRAN), and multimedia mobile access communication (MMAC) systems, wireless local area networks, local multipoint distribution service (LMDS) IF strips, wireless digital video, wireless USB links, wireless IEEE 1394 links, TDMA packet radios, low-cost point-to-point links, voice-over-IP portable "cell phones" (wireless Internet telephones), etc.

One embodiment is particularly suitable for a proposed high speed/high throughput variant of the IEEE 802.11 standard called the IEEE 802.11n proposed standard. It is expected that a second SIGNAL field or an extended SIGNAL field will be used, and including the cell identification information is such a second or extended SIGNAL field is one aspect of the invention.

All publications, patents, and patent applications cited herein are hereby incorporated by reference.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A method comprising:
   wirelessly receiving a packet at a first wireless station belonging to a cell of a wireless network, the network for communicating according to a wireless network standard, each transmitting station of the cell able to transmit a packet that includes cell identification information; and
   ascertaining at the physical layer level of the first station whether or not the received packet is from another station of the cell by ascertaining whether or not the received packet includes the cell identification information of the cell,
   wherein a packet according to the network standard includes a preamble followed by a modulated payload, and wherein the preamble of a packet transmitted by a station of the cell conveys the cell identification information of the cell.

2. A method as recited in claim 1, further comprising:
   aborting processing the received packet if the ascertaining step ascertains that the received packet does not include the cell identification information of the cell.

3. A method as recited in claim 1, wherein the cell is an infrastructure network having an access point, and wherein the first wireless station is an access point, the method further comprising:
   transmitting the cell identification information to other stations of the cell such that the other stations can include the cell identification information in packets that other stations transmit.

4. A method as recited in claim 1, wherein a first number of bits are provided for the cell identification information of the cell, and wherein the first number of bits are encoded into coded form of a second number of bits greater than the first number of bits according to a coding method to provide for robust communication of the cell identification information.

5. A method as recited in claim 1, wherein the standard is one of the OFDM variants of the IEEE 802.11 standard according to which the preamble includes a set of short symbols, and wherein the cell identification information of the cell is conveyed in a plurality of the short symbols encoded such that each cell is given a different sequence.

6. A method as recited in claim 1, wherein the cell identification information of the cell is conveyed by BPSK encoding a subset of the short symbols.

7. A method as recited in claim 1, wherein the cell identification information of the cell is conveyed by QPSK encoding a subset of the short symbols.

8. A method as recited in claim 1, wherein a first number of bits are provided for the cell identification information of the cell, and wherein the first number of bits are encoded into coded form of a second number of bits greater than the first number of bits according to a coding method to provide for robust communication of the cell identification information.

9. A method as recited in claim 1, wherein the first wireless station includes a start-of-packet (SOP) detector that has a settable signal strength threshold such that received signals of received signal strength below the settable threshold do not trigger the start of packet detector, the method further comprising:

adjusting the settable threshold according to the signal strengths of one or more received at the station and ascertained not to be from other stations of the cell.

10. A method as recited in claim 1, wherein the station uses information of received packets that are ascertained to be not from other stations of the cell to mitigate interference from such stations that are not of the cell.

11. A method comprising:

wirelessly receiving a packet at a first wireless station belonging to a cell of a wireless network, the network for communicating according to a wireless network standard, each transmitting station of the cell able to transmit a packet that includes cell identification information; and ascertaining at the physical layer level of the first station whether or not the received packet is from another station of the cell by ascertaining whether or not the received packet includes the cell identification information of the cell, wherein a packet according to the network standard includes a preamble and a modulated part, wherein the modulated part includes reserved or empty bits, and wherein some or all of the reserved or empty bits in the modulated part of a packet transmitted by a station of the cell convey the cell identification information of the cell.

12. A method as recited in claim 11, wherein the standard is one of the OFDM variants of the IEEE 802.11 standard according to which the modulated part of a packet includes a SIGNAL field that provides information on how the remainder of the packet is encoded, the SIGNAL field including the reserved or empty bits, such that or all of the reserved or empty bits in the SIGNAL field of a packet transmitted by a station of the cell convey the cell identification information of the cell.

13. A method as recited in claim 11, wherein the standard is one of the OFDM variants of the IEEE 802.11 standard according to which the modulated part of a packet includes a SERVICE field including reserved or empty bits, and wherein some or all of the reserved or empty bits in the SERVICE field of a packet transmitted by a station of the cell convey the cell identification information of the cell.

14. A method as recited in claim 13, wherein a first number of bits are provided for the cell identification information of the cell, and wherein the first number of bits are encoded into coded form of a second number of bits greater than the first number of bits according to a coding method to provide for robust communication of the cell identification information.

15. A method as recited in claim 11, further comprising:

aborting processing the received packet if the ascertaining step ascertains that the received packet does not include the cell identification information of the cell.

16. A method as recited in claim 11, wherein the cell is an infrastructure network having an access point, and wherein the first wireless station is an access point, the method further comprising:

transmitting the cell identification information to other stations of the cell such that the other stations can include the cell identification information in packets that other stations transmit.

17. A method as recited in claim 11, wherein the station uses information of received packets that are ascertained to be not from other stations of the cell to mitigate interference from such stations that are not of the cell.

18. A method as recited in claim 11, wherein the first wireless station includes a start-of-packet (SOP) detector that has a settable signal strength threshold such that received signals of received signal strength below the settable threshold do not trigger the start of packet detector, the method further comprising:

adjusting the settable threshold according to the signal strengths of one or more received at the station and ascertained not to be from other stations of the cell.

19. A method as recited in claim 17, wherein the first wireless station includes an array of antenna elements, a set of radio receivers coupled to the array of antenna elements, and a spatial processor coupled to the radio receivers able to form a received signal according to a smart antenna processing strategy, the method further comprising:

forming the smart antenna processing strategy using information of one or more received packets that are ascertained to be not from one or more other stations of the cell to mitigate interference from such one or more other stations.

20. A method as recited in claim 19, wherein the first wireless station includes a start-of-packet (SOP) detector that has a settable signal strength threshold such that received signals of received signal strength below the settable threshold do not trigger the start of packet detector, the method further comprising:

adjusting the settable threshold according to the signal strengths of one or more packets received at the station and ascertained not to be from other stations of the cell.

21. A method as recited in claim 11, wherein the modulated part of a packet according to the network standard includes a field that provides information on how the remainder of the packet is encoded, the field according to the standard including the reserved or empty bits, such that some or all of the reserved or empty bits in the field of a packet transmitted by a station of the cell convey the cell identification information of the cell.

22. A method comprising:

wirelessly receiving a packet at a first wireless station belonging to a cell of a wireless network, the network for communicating according to a wireless network standard, each transmitting station of the cell able to transmit a packet that includes cell identification information; and ascertaining at the physical layer level of the first station whether or not the received packet is from another station of the cell by ascertaining whether or not the received packet includes the cell identification information of the cell, wherein the standard is related to one of the OFDM variants of the IEEE 802.11 standard, according to which the modulated part of a packet includes a SIGNAL field, and wherein the SIGNAL field provides for a station of the cell to convey the cell identification information of the cell.

23. A method comprising:

wirelessly transmitting a packet from a first wireless station belonging to a cell of a wireless network, the network for communicating according to a wireless network standard, the transmitted packet including cell identification information, the cell identification information is included in a manner such that a second station receiving the transmitted packet can ascertain at the physical layer level whether or not the received packet is from a station of the same cell as that of the the second station by ascertaining whether or not the received racket includes the cell identification information of the same cell as that of the second station, wherein a packet according to the network standard includes a preamble followed by a modulated payload, and wherein the preamble of a packet transmitted by a station of the cell conveys the cell identification information of the cell.

24. A method as recited in claim 23, wherein the standard is one of the OFDM variants of the IEEE 802.11 standard according to which the preamble includes a set of short symbols, and wherein the cell identification information of the cell is conveyed in a plurality of the short symbols encoded such that each cell is given a different sequence.

25. A method as recited in claim 23, wherein a first number of bits are provided for the cell identification information of the cell, and wherein the first number of bits are encoded into coded form of a second number of bits greater than the first number of bits according to a coding method to provide for robust communication of the cell identification information.

26. A method comprising:

wirelessly transmitting a packet from a first wireless station belonging to a cell of a wireless network, the network for communicating according to a wireless network standard, the transmitted packet including cell identification information, the cell identification information being included in a manner such that a second station receiving the transmitted packet can ascertain at the physical layer level whether or not the received packet is from a station of the same cell as that of the second station by ascertaining whether or not the received racket includes the cell identification information of the same cell as that of the second station, wherein a packet according to the network standard includes a preamble and a modulated part, wherein the modulated part includes reserved or empty bits, and wherein some or all of the reserved or empty bits in the field of a packet transmitted by a station of the cell convey the cell identification information of the cell.

27. A method as recited in claim 26, wherein the modulated part of a packet according to the network standard includes a field that provides information on how the remainder of the packet is encoded, the field according to the standard including reserved or empty bits, and some or all of the reserved or empty bits in the field of a packet transmitted by a station of the cell convey the cell identification information of the cell.

28. A method as recited in claim 26, wherein the modulated part of a packet according to the network standard includes a field that provides information on how the remainder of the packet is encoded and that provides cell identification information, such that the field of a packet transmitted by a station of the cell conveys the cell identification information of the cell.

29. A first wireless station able to be part of a cell of a wireless network, the network for communicating according to a wireless network standard, the first wireless station comprising:

a wireless receiver able to receive a packet from another station of a cell, each other station of the cell able to transmit a packet that includes cell identification information, the receiver including a physical layer processor (PHY) able to ascertain at the physical layer level whether or not a packet received by the receiver packet is from another station of the cell by ascertaining whether or not the received packet includes the cell identification information of the cell, wherein a packet according to the network standard includes a preamble followed by a modulated payload, and wherein the preamble of a packet transmitted by a station of the cell conveys the cell identification information of the cell.

30. A first wireless station as recited in claim 29, wherein a first number of bits are provided for the cell identification information of the cell, and wherein the first number of bits are encoded into coded form of a second number of bits greater than the first number of bits according to a coding method to provide for robust communication of the cell identification information.

31. A wireless station as recited in claim 29, further comprising:

an array of antenna elements, a set of radio receivers coupled to and able to receive signals from each antenna element, and a spatial processor coupled to the set of radio receivers, the spatial processor forming a received signal according to a smart antenna processing strategy, the spatial processor able to form the smart antenna processing strategy using information of one or more received packets that are ascertained to be not from one or more other stations of the cell to mitigate interference from such one or more other stations.

32. A first wireless station as recited in claim 29, wherein the standard is one of the OFDM variants of the IEEE 802.11 standard according to which the preamble includes a set of short symbols, and wherein the cell identification information of the cell is conveyed in a plurality of the short symbols encoded such that each cell is given a different sequence.

33. A first wireless station able to be part of a cell of a wireless network, the network for communicating according to a wireless network standard, the first wireless station comprising:

a wireless receiver able to receive a packet from another station of a cell, each other station of the cell able to transmit a packet that includes cell identification information, the receiver including a physical layer processor (PHY) able to ascertain at the physical layer level whether or not a packet received by the receiver packet is from another station of the cell by ascertaining whether or not the received packet includes the cell identification information of the cell, wherein a packet according to the network standard includes a field that provides information on how the remainder of the packet is encoded and for cell identification information, such that field of a packet transmitted by a station of the cell conveys the cell identification information of the cell.

34. A first wireless station able to be art of a cell of a wireless network, the network for communicating according to a wireless network standard, the first wireless station comprising:

a wireless receiver able to receive a packet from another station of a cell, each other station of the cell able to transmit a packet that includes cell identification information, the receiver including physical layer processor (PHY) able to ascertain at the physical layer level whether or not a packet received by the receiver packet is from another station of the cell by ascertaining whether or not the received packet includes the cell identification information of the cell, wherein a packet according to the network standard includes a preamble and a modulated part, wherein the modulated part includes reserved or empty bits, and wherein some or all of the reserved or empty bits in the modulated part of a packet transmitted by a station of the cell convey the cell identification information of the cell.

35. A wireless station as recited in claim 34, wherein the modulated part of a packet according to the network standard includes a field that provides information on how the remainder of the packet is encoded, the field according to the standard including reserved or empty bits, such that some or all of the reserved or empty bits in the field of a packet transmitted by a station of the cell convey the cell identification information of the cell.

36. A wireless station as recited in claim 34, wherein the wireless receiver of the first wireless station includes a start-of-packet (SOP) detector that has a settable signal strength threshold such that received signals of received signal strength below the settable threshold do not trigger the start of packet detector, the wireless receiver further comprising a controller that is able to adjust the settable threshold according to the signal strengths of one or more received at the station and ascertained not to be from other stations of the cell.

37. A wireless station as recited in claim 34, further comprising:
  an array of antenna elements, a set of radio receivers coupled to and able to receive signals from each antenna element, and a spatial processor coupled to the set of radio receivers, the spatial processor forming a received signal according to a smart antenna processing strategy, the spatial processor able to form the smart antenna processing strategy using information of one or more received packets that are ascertained to be not from one or more other stations of the cell to mitigate interference from such one or more other stations.

38. A carrier medium comprising one or more computer readable code segments to instruct a processor to implement a method in a first wireless station, the method comprising:
  wirelessly receiving a packet at the first wireless station, the first wireless station belonging to a cell of a wireless network, the network for communicating according to a wireless network standard, each transmitting station of the cell able to transmit a packet that includes cell identification information; and
  ascertaining at the physical layer level whether or not the received packet is from another station of the cell by ascertaining whether or not the received packet includes the cell identification information of the cell,
  wherein a packet according to the network standard includes a preamble followed by a modulated payload, and wherein the preamble of a packet transmitted by a station of the cell conveys the cell identification information of the cell.

39. A carrier medium as recited in claim 38, wherein a first number of bits are provided for the cell identification information of the cell, and wherein the first number of bits are encoded into coded form of a second number of bits greater than the first number of bits according to a coding method to provide for robust communication of the cell identification information.

40. A carrier medium as recited in claim 38, wherein the first wireless station includes a start-of-packet (SOP) detector that has a settable signal strength threshold such that received signals of received signal strength below the settable threshold do not trigger the start of packet detector, the method further comprising:
  adjusting the settable threshold according to the signal strengths of one or more received at the station and ascertained not to be from other stations of the cell.

41. A carrier medium as recited in claim 38, wherein the standard is one of the OFDM variants of the IEEE 802.11 standard according to which the preamble includes a set of short symbols, and wherein the cell identification information of the cell is conveyed in a plurality of the short symbols encoded such that each cell is given a different sequence.

42. A carrier medium as recited in claim 38, wherein the first wireless station uses information of received packets that are ascertained to be not from other stations of the cell to mitigate interference from such stations that are not of the cell.

43. A carrier medium as recited in claim 42, wherein the first wireless station includes an array of antenna elements, a set of radio receivers coupled to the array of antenna elements, and a spatial processor coupled to the radio receivers able to form a received signal according to a smart antenna processing strategy, the method further comprising:
  forming the smart antenna processing strategy using information of one or more received packets that are ascertained to be not from one or more other stations of the cell to mitigate interference from such one or more other stations.

44. A carrier medium comprising one or more computer readable code segments to instruct a processor to implement a method in a first wireless station, the method comprising:
  wirelessly receiving a packet at the first wireless station, the first wireless station belonging to a cell of a wireless network, the network for communicating according to a wireless network standard, each transmitting station of the cell able to transmit a packet that includes cell identification information; and
  ascertaining at the physical layer level whether or not the received packet is from another station of the cell by ascertaining whether or not the received packet includes the cell identification information of the cell,
  wherein a packet according to the network standard includes a preamble and a modulated part, wherein the modulated part includes reserved or empty bits, and wherein some or all of the reserved or empty bits in the field of a packet transmitted by a second station of the cell convey the cell identification information of the cell.

45. A carrier medium as recited in claim 44, wherein the modulated part of a packet according to the network standard includes a field that provides information on how the remainder of the packet is encoded, the field according to the standard including reserved or empty bits, such that some or all of the reserved or empty bits in the field of a packet transmitted by a station of the cell convey the cell identification information of the cell.

46. A carrier medium as recited in claim 44, wherein the first wireless station includes a start-of-packet (SOP) detector that has a settable signal strength threshold such that received signals of received signal strength below the settable threshold do not trigger the start of packet detector, the method further comprising:
  adjusting the settable threshold according to the signal strengths of one or more received at the station and ascertained not to be from other stations of the cell.

47. A carrier medium as recited in claim 44, wherein the standard is one of the OFDM variants of the IEEE 802.11 standard according to which a packet includes a SIGNAL field that provides information on how the remainder of the packet is encoded, the SIGNAL field including the reserved or empty bits, such that some or all of the reserved or empty bits in the SIGNAL field of a packet transmitted by a station of the cell convey the cell identification information of the cell.

48. A carrier medium as recited in claim 44, wherein the first wireless station uses information of received packets that are ascertained to be not from other stations of the cell to mitigate interference from such stations that are not of the cell.

49. A carrier medium as recited in claim 48, wherein the first wireless station includes an array of antenna elements, a set of radio receivers coupled to the array of antenna elements, and a spatial processor coupled to the radio receivers able to form a received signal according to a smart antenna processing strategy, the method further comprising:

forming the smart antenna processing strategy using information of one or more received packets that are ascertained to be not from one or more other stations of the cell to mitigate interference from such one or more other stations.

50. A first wireless station configurable to be part of a cell of a wireless network, the network for communicating according to a wireless network standard, the first wireless station comprising:

means for receiving a packet from another station of a cell, each station of the cell able to transmit a packet that includes cell identification information, the means for receiving including a physical layer processor (PHY) that includes means for ascertaining at the physical layer level whether or not a packet received by the receiver packet is from another station of the cell by ascertaining whether or not the received packet includes the cell identification information of the cell, wherein a packet according to the network standard includes a preamble followed by a modulated payload, and wherein the preamble of a packet transmitted by a station of the cell conveys the cell identification information of the cell.

51. A first wireless station as recited in claim 50, wherein the standard is one of the OFDM variants of the IEEE 802.11 standard according to which the preamble includes a set of short symbols, and wherein the cell identification information of the cell is conveyed in a plurality of the short symbols encoded such that each cell is given a different sequence.

52. A first wireless station as recited in claim 50, wherein a first number of bits are provided for the cell identification information of the cell, and wherein the first number of bits are encoded into coded form of a second number of bits greater than the first number of bits according to a coding method to provide for robust communication of the cell identification information.

53. A first wireless station as recited in claim 50, wherein a first number of bits are provided for the cell identification information of the cell, and wherein the first number of bits are encoded into coded form of a second number of bits greater than the first number of bits according to a coding method to provide for robust communication of the cell identification information.

54. A first wireless station configurable to be part of a cell of a wireless network, the network for communicating according to a wireless network standard, the first wireless station comprising:

means for receiving a packet from another station of a cell, each station of the cell able to transmit a packet that includes cell identification information, the means for receiving including a physical layer processor (PHY) that includes means for ascertaining at the physical layer level whether or not a packet received by the receiver packet is from another station of the cell by ascertaining whether or not the received packet includes the cell identification information of the cell, wherein a packet according to the network standard includes a preamble and a modulated part, wherein the modulated part includes reserved or empty bits, and wherein some or all of the reserved or empty bits in the field of a packet transmitted by a station of the cell convey the cell identification information of the cell.

55. A first wireless station configurable to be part of a cell of a wireless network, the network for communicating according to a wireless network standard, the first wireless station comprising:

means for receiving a packet from another station of a cell, each station of the cell able to transmit a packet that includes cell identification information, the means for receiving including a physical layer processor (PHY) that includes means for ascertaining that the physical layer level whether or not a packet received by the receiver packet is from another station of the cell by ascertaining whether or not the received packet includes the cell identification information of the cell, wherein a packet according to the network standard includes a field that provides information on how the remainder of the packet is encoded and for cell identification information, such that a packet transmitted by a station of the cell conveys the cell identification information of the cell.

56. A wireless station as recited in claim 55, wherein the means for receiving of the packet includes means for detecting a start-of-packet (SOP) that has a settable signal strength threshold such that received signals of received signal strength below the settable threshold do not trigger the start of packet detector, the wireless receiver further comprising means for adjusting the settable threshold according to the signal strengths of one or more received at the station and ascertained not to be from other stations of the cell.

57. A wireless station as recited in claim 55, wherein the modulated part of a packet according to the network standard includes a field that provides information on how the remainder of the packet is encoded, the field according to the standard including reserved or empty bits, such that some or all of the reserved or empty bits in the field of a package transmitted by a station of the cell convey the cell identification information of the cell.

58. A carrier medium comprising one or more computer readable code segments to instruct a processor to implement a method in a first wireless station, the method comprising:

wirelessly receiving a packet at the first wireless station, the first wireless station belonging to a cell of the wireless network, the network for communicating according to a wireless network standard, each transmitting station of the cell able to transmit a packet that includes cell identification information; and ascertaining at the physical layer level whether or not the received packet is from another station of the cell by ascertaining whether or not the received packet includes the cell identification information of the cell, wherein a packet according to the network standard includes a field that provides information on how the remainder of the packet is encoded and for cell identification information, such that field of a packet transmitted by a station of the cell conveys the cell identification information of the cell.

* * * * *

UNITED STATES PATENT AND TRADEMARK OFFICE
CERTIFICATE OF CORRECTION

PATENT NO. : 7,075,906 B2  Page 1 of 1
APPLICATION NO. : 10/676878
DATED : July 11, 2006
INVENTOR(S) : Douglas et al.

It is certified that error appears in the above-identified patent and that said Letters Patent is hereby corrected as shown below:

In column 1, line 11, kindly change "(PLANS)." to --(WLANS).--.

In column 4, line 66, kindly change "packet if from" to --packet is from--.

In column 19, line 3, kindly change "received racket" to --received packet--.

In column 19, line 35, kindly change "received racket" to --received packet--.

In column 24, line 18, kindly change "for ascertaining that the " to --for ascertaining at the--.

In column 24, line 30, kindly change "as recited in claim 55," to --as recited in claim 54,--.

In column 24, line 39, kindly change "as recited in claim 55," to --as recited in claim 54,--.

In column 24, line 44, kindly change "field of a package" to --field of a packet--.

In column 24, line 51, kindly change "to a cell of the" to --to a cell of a--.

Signed and Sealed this

Twenty-ninth Day of August, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,075,906 B2 | Page 1 of 1 |
| APPLICATION NO. | : 10/676878 | |
| DATED | : July 11, 2006 | |
| INVENTOR(S) | : Douglas et al. | |

It is certified that error appears in the above-identified patent and that said Letters Patent is hereby corrected as shown below:

In column 16, line 53, kindly change "claim 1" to --claim 5--.

In column 16, line 56, kindly change "claim 1" to --claim 5--.

Signed and Sealed this

Twenty-sixth Day of January, 2010

David J. Kappos
*Director of the United States Patent and Trademark Office*